United States Patent [19]
McBride

[11] Patent Number: 4,649,665
[45] Date of Patent: Mar. 17, 1987

[54] TREE BRANCH SPREADER

[76] Inventor: Jim C. McBride, Rte. 1, Box 1308, Wapato, Wash. 98951

[21] Appl. No.: 747,872

[22] Filed: Jun. 24, 1985

[51] Int. Cl.$^4$ ............................................. A01G 17/04
[52] U.S. Cl. ......................................................... 47/42
[58] Field of Search ................ 47/42, 43, 4; 248/351, 248/357, 49, 72, 235, 70, 65; 33/573, 567, 178 R, 178 B, 521, 534, 536

[56] References Cited

U.S. PATENT DOCUMENTS

| | | | |
|---|---|---|---|
| 494,622 | 4/1893 | Bradley | 248/235 |
| 819,370 | 5/1906 | Noacre | 33/168 |
| 999,908 | 8/1911 | Tatro | 47/43 |
| 1,389,486 | 8/1921 | Brewer | 33/168 |
| 2,359,797 | 10/1944 | Schnider | 312/351 |
| 2,471,961 | 5/1949 | Jones | 33/178 |
| 2,699,601 | 1/1955 | Darnell | 248/49 |
| 4,210,181 | 7/1980 | Clevenger | 141/392 |
| 4,344,053 | 3/1983 | Roark | 47/42 |

FOREIGN PATENT DOCUMENTS

| | | | |
|---|---|---|---|
| 355672 | 12/1922 | Fed. Rep. of Germany | 47/42 |
| 523734 | 4/1931 | Fed. Rep. of Germany | 33/178 |
| 546009 | 6/1942 | United Kingdom | 33/178 D |

*Primary Examiner*—James R. Feyrer
*Attorney, Agent, or Firm*—Roy E. Mattern, Jr.

[57] ABSTRACT

A tree branch spreader is used for structural training and orienting the position of growing branches to shape the tree for its intended purpose, such as maximizing the fruit yield for orchardists. The branch spreader is preferably trapezoidal in shape and comprises an elongated spacer portion and opposite ends, each of which further comprising a plurality of intercommunicating notches within which the branches are protectively and removably secured during growth. In the preferred embodiment, smaller primary notches at each end of the spreader are longitudinally positioned at an interiormost location along the spreader, opening into and communicating with a larger secondary notch which in turn opens to communicate with a largest tertiary notch at the exteriormost location of the opposite ends of the spreader. The primary notches each comprise a transversely positioned resting surface and oppositely spaced apart sidewalls displaced perpendiculary therefrom. Adjacent larger secondary and tertiary notches comprise a pair of resting surfaces, extending perpendicularly from the outer edges of the adjacent smaller notch and communicating with a pair of sidewalls, each depending perpendicularly from its respective resting surface. The resting surfaces of the opposite ends are positioned in coplanar alignment, forming an acute angle with respect to the top surface of the spreader. Additionally, the resting surfaces are curved inwardly in a concave manner.

4 Claims, 6 Drawing Figures

TREE BRANCH SPREADER

BACKGROUND

A major concern of orchardists and foresters is proper structural tree training. It is important that tree branches as well as limbs and branches of some other shrubs and plants be supported and trained properly early during their growth to insure healthy and proper continued growth. Symmetrical orientation and structural spacing of tree branches are often necessary for increasing orchard output and productivity as well as for enhancing aesthetics of tree arrangements in an arboretum for example.

These requirements are particularly important for fruit growers, such as apple orchardists, concerned about maximizing crop yield in their orchards.

An apparatus typically needs to be used to spread apart and support the branches of fruit trees between roughly their second through twelfth years of growth. As the trees increase in size as well as complexity and number of branches, more spreading apparatuses will need to be used, placed strategically in various locations between pairs of branches or between the trunk and lower limbs of the tree.

A common technique which has been and is still used to structurally train branches is to use a stick or narrow board made of wood having nails extending longitudinally from each of the opposite ends of the board. The stick or board is then placed between two branches with the nails being arranged on the board so that the branches bear against the ends of the nails thereby forcing the branches apart.

German Pat. No. 355,672 discloses an adjustable support device with U-shaped ends which appears to be telescopic. The support device is shown extending between the tree trunk and an adjacent branch.

Roark, U.S. Pat. No. 4,377,053 discloses a telescopic prop for spreading and supporting tree branches. The prop also has V-shaped notched ends.

These and other similar inventions would appear at first to fill the needs of the orchardist in providing structural tree training and support. There still remained needs, however, for a safer means of structural tree training which would not damage the growing branches, as is likely with use of nails, especially during early growth and which would securely contain and guide branches of varying and increasing diameter during their progressive growth stages.

The invention described by the German patent as well as Roark's invention appear to be designed as a support or a prop and are not intended to be primarily used to safely secure and structurally train branches during their successive formative stages of growth. In this regard, neither of these inventions disclose an apparatus which is structurally adapted for replacement and reuse with branches of different growing sizes and diameters.

Another requirement as well is to provide equipment which will be easier and cheaper to manufacture. A typical tree, often needing between four and twelve spreaders to be used during the formative growth periods, will require that an orchardist or fruit grower obtain a large number of spreaders to meet the needs of his business.

In fulfilling these needs by using the present invention, the orchardist could easily and safely place and later reposition several tree branch spreaders in selected locations to support and separate branches as well as orienting and guiding them to proper formation. As the branches grow, the same spreading apparatus could continue to be reused eliminating the need for replacement with another spreader with successive increase in diameter of the branches.

SUMMARY OF THE INVENTION

A tree branch spreader is used for structural training and protectively orienting the growing tree branches during the formative stages of growth and shaping the tree for its intended purpose. The tree branch spreader provides support and separation of branches of varying diameters and comprises an elongated spacer portion and opposite ends which each further comprise a plurality of integrally formed and intercommunicating notches. The spreader is preferably shaped as a trapezoid, having a top surface and parallel bottom surface. The opposite ends thereby form angles of substantially 45 degrees. Smaller primary notches are located at an interiormost location along the longitudinal axis of the spreader proximate each opposite end and each further comprise a resting surface and two oppositely spaced apart sidewalls depending therefrom toward the ends of the spreader. The primary notches open into and communicate with a larger secondary notch which comprises two resting surfaces, each depending away from the primary notch and in parallel alignment with the resting surface of the primary notch, and a pair of sidewalls, each displaced perpendicularly from the resting surfaces and extending outwardly toward the ends of the spreader. A tertiary terminating notch is formed in a similar manner, comprising resting surfaces and perpendicularly displaced sidewalls. Additional notches may be similarly formed in this terraced like fashion, each notch increasing in width between the smaller primary notch and the ends of the spreader. The resting surfaces are preferably curved inwardly in a concave manner to provide a path of travel for the growing branches which will extend them upwardly and outwardly to properly shape the tree. The spreaders may be placed between two opposing branches in the tree whereby the branches are initially removably positioned within the smaller primary notches during earliest stages of growth. As the branches increase in diameter, they are repositioned within the progressively larger notches as needed. Alternative embodiments provide for divergent sidewalls of the notches and beveled edges to facilitate transition between the various size notches and to prevent damage to the branches during training.

DESCRIPTION OF THE PREFERRED EMBODIMENT

Introduction

A tree branch spreader 10 is used to support and guidingly orient the growing branches in preferred predesignated formations during early stages of growth to shape the tree for its intended purpose such as orchard productivity of fruit trees, shade and ornamental beauty.

The tree branch spreader 10 or spreader 10 is primarily adapted for use with orchard trees such as apple trees to insure optimal structural growth and maximization of fruit yield. The spreader is not limited to orchards, however, and may be adapted for use with a variety of trees, plants and shrubbery.

Figure 2:
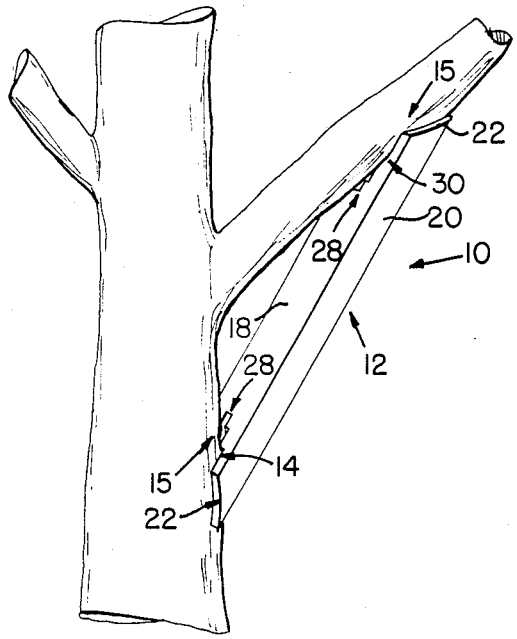
FIG. 2 is an enlarged isometric view of a portion of the tree with a spreader being positioned between the tree trunk and a limb to support and train the lower limb.
Figure 3:
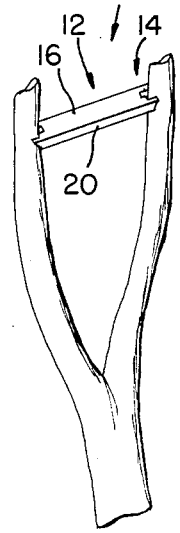
FIG. 3 is a enlarged isometric view of a section of the tree showing the spreader in relative upright position (the top surface facing upwardly) and use in separating and guidingly training a pair of opposing branches on the upper portions of the tree.
Figure 6:
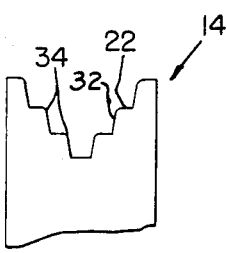
FIG. 6 is an overhead view of an alternative embodiment of the tree branch spreader whereby the notches incorporate divergent sidewalls and the contiguous edges are shaped as beveled edges.
Figure 4:
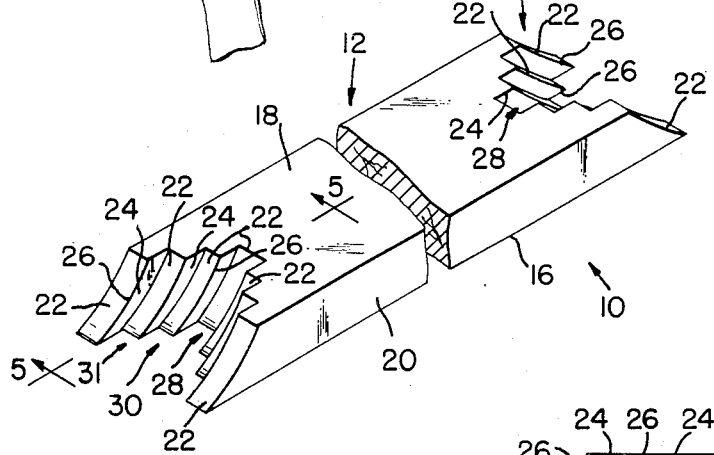
FIG. 4 is an isometric view of the opposite ends of the spreader showing the specific configuration of the notches. Broken lines are used to indicate additional length of the spreader.
Figure 5:
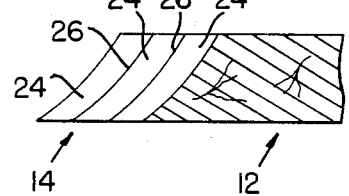
FIG. 5 is a sectional view taken along line 5—5 of FIG. 4 showing the sidewalls and contiguous edges of the notches.

As shown in FIGS. 2 and 3, the preferred embodiment of the spreader 10 broadly comprises an elongated spacer portion 12 and opposite ends 15 which each further comprise a plurality of intercommunicating symmetrical notches 14, integrally formed within each of the opposite ends 15 of the spreader 10. Commencing with a smaller primary notch 28 positioned at an interiormost location along the length of the spreader 10 proximate each end, a plurality of successively larger and wider intercommunicating notches 14 extend to the ends of the spreader 10, each smaller notch opening into and communicating with a progressively larger notch in terrace like fashion as shown in FIGS. 4 and 6.

The spreader 10 may be adaptably positioned between two opposing branches in the upper portion of the tree, or supportively braced between the tree trunk and a lower branch, as shown in FIGS. 3 and 2 respectively. The branches are insertably and removably placed within the notches 14 which serve as paths to safely orient the direction of growth of the branches or lower limbs. The spreaders 10 adaptably comprise progressively wider and larger notches to allow reuse and replacement of the spreaders with limbs of varying diameter rather than to require continuous replacement of a larger spreader 10 as the branches grow. The notches 14 are adapted to contact the growing branch against resting surfaces 22, sidewalls 24 and contiguous edges 26 while permitting unrestricted growth and preventing injury to the saplings and young branches during the various growth stages as shown in FIGS. 2 and 3.

The Spreader Broadly Comprises a Trapezoid Structure

The preferred embodiment of the spreader generally comprises a trapezoidal structure, having a top surface 16, a parallel bottom surface 18, opposite sides 20 and two opposite ends 15. The top surface 16 extends beyond the length of the bottom surface 18 whereby the opposite ends 15 are formed at angles of substantially 45 degrees as shown in FIGS. 2 and 4. The elongated spacer portion 12 or spacer 12 extends between the opposite ends 15 of the spreader 10. The advantages of the shape and angle of the opposite ends will be further described below.

Surfaces of the Opposite Ends of the Spreader Comprise a Succession of Intercommunicating Notches Each Having One or More Resting Surfaces and Sidewalls Each of the opposite ends 15 of the spreader in the preferred embodiment further comprise a plurality of symmetrically intercommunicating notches 14, integrally formed within the opposite ends 15 and extending outwardly from the spacer 12. A smaller primary notch 28 is centrally located between the opposite sides 20 of the spreader 10 and at an interiormost location along the longitudinal axis of the spreader from each opposite end. The primary notch 28 comprises a resting surface 22 and the sidewalls 24. The resting surface 22 is transversely positioned to the longitudinal axis of the spreader with the sidewalls 24, being spaced apart in parallel alignment and depending perpendicularly from the resting surface 22 to form a U-shaped partial enclosure. Each pair of the sidewalls 24 extends longitudinally toward their respective opposite end 15 of the spreader to terminate at and define a contiguous edge 26 with a resting surface 22 of a larger secondary notch 30 as shown in FIG. 4. Communicating with and extending from the small primary notch 28, the larger secondary notch 30 comprises two resting surfaces 22, oppositely spaced apart and extending away from the sidewalls 24 of the primary notch 28 and in parallel alignment with the resting surface 22 of the primary notch 28 as shown in FIG. 4. Each resting surface 22 of the larger secondary notch 30 terminates at a sidewall 24, which extends outwardly therefrom in similar fashion to and in parallel alignment with the sidewalls 24 of the primary notch 28 to define the larger secondary notch 30 also shown in FIG. 4.

The larger secondary notch 30 then opens into and communicates with a largest tertiary notch 31. Comprising resting surfaces 22 extending from the contiguous edges 26, and perpendicularly displaced sidewalls 24, the tertiary notch 31 is formed in like fashion to the secondary notch 30. Each opposite end 15 terminates in a resting surface 22, which extends between the sidewalls 24 of the tertiary notch 31 and the opposite sides 20 of the spreader 10 as shown in FIGS. 2 and 4.

As shown in the drawings, the notches are thereby formed in terrace like fashion. The pairs of resting surfaces extend from the preceding notch to establish the increased width (substantially doubled) of the larger adjacent notch. The preferred embodiment of the spreader 10 incorporates three such successive groups of notches 14 at each opposite end 15. The number of notches 14 may vary however according to the overall width of the spreader or needs of the particular orchardist.

As shown in FIG. 4, the resting surfaces 22 of the opposite ends 15 are in parallel alignment, sloped at an angle of substantially 45 degrees between the bottom surface 18 and top surface 16 of the spreader 10, with respect to the opposite ends 15 of the spreader 10 at the top surface 16. The resting surfaces 22 also are preferably curved inwardly in a concave manner as shown in the drawings. The spreader may then be adaptably positioned against the tree to extend angularly from the trunk to train a lower limb as shown in FIG. 2. The formation of the resting surfaces 22 also provides a path of travel for orienting the upper branches of the tree during growth as is further described below.

Figure 1:
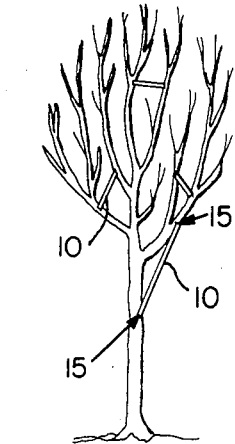
FIG. 1 is an environmental view showing several tree branch spreaders in use in structurally training and spreading upper branches of the tree as well as supportively guiding a lower limbs relative to the tree trunk.

Spreaders May be Used to Support Lower Limbs or Guidingly Separate Upper Branches of Varying Diameter in Structural Training of the Tree During Several Stages of Growth The tree branch spreader 10 may be used in combination with other spreaders 10 in several selected locations of the tree as shown in FIG. 1. Used to support a lower limb or supportively guide a branch as shown in FIGS. 1 and 2, the spreader 10 is adaptably positioned with the bottom surface 18 facing relatively upwardly and abutting the tree trunk at one end while supportively abutting the limb upwardly and outwardly at the other. The spreader 10 thereby provides a strut for these branches or lower limbs. The outermost resting surfaces 22 and their respective contiguous edges 26 of the spreader 10 provide contact with larger limbs and tree trunks (shown in FIG. 2) while smaller diameter limbs and branches are cradled within the primary and secondary notches 14.

The spreader 10 may also be used for spreading and training growing branches at the upper levels of the tree as shown in FIGS. 1 and 3. In these situations as well, each spreader is selectively placed between a pair of adjacent or opposing branches with either the bottom surface or top surface facing relatively upwardly, depending on the position of the branches. The angled ends and curved shape of the opposite ends 15 encourage outward as well as upward growth of the limbs and branches. When securing the spreader in place becomes more difficult, such as in windy conditions, the spreader is adapted for the contiguous edges to bear against the branches as shown in FIG. 3. In this case, the bark is penetrated resulting in discharge of sap. The sap is then permitted to flow through the spaces between the notches so as to prevent a choking of the branch growth or a girdling effect.

Frictional and compressional forces of the branches and/or tree trunk bearing against the contiguous edges 26 and/or resting surfaces 22 allow the spreaders to be held in place without additional attachment means. During the initial stage of growth, the branches are removably placed within the smaller primary notches 28. The branches of a young sapling may subsequently be repositioned within the secondary 30 and tertiary notches 31, cradled against edges or surfaces of the notch 14 depending on the particular application. Thus as the branches continue to grow, they may be moved to the next largest notch, repeating this process when the branch or limb diameter becomes too large for its present notch. Within the largest notch, the branches will likely have developed a somewhat consistent structural pattern thereby eliminating the need for further training when the branch outgrows this terminating notch.

To facilitate relocation of the branches from each notch to a successively larger notch, the sidewalls of each notch may be formed to depend angularly from their respective resting surface, shown in FIG. 6 as diverging sidewalls 32. Forming a somewhat V shaped notch, the diverging sidewalls 32 encourage movement of the growing branches toward the adjacent larger notch as the diameter increases thereby reducing the need to manually remove the branches from the smaller notches prior to becoming wedged within the smaller notch.

In addition, the contiguous edges of the notches may be beveled, shown in an alternative embodiment of FIG. 6 as beveled edges 34 to protect the branches and limbs from abrasion particularly during transition between one size notch to the next.

Spreaders 10 having spacer portions 12 of various lengths may be used in different locations on the tree as shown in FIG. 1.

The spreaders 10 are preferably made from wood. Alternative embodiments of the spreader may include using notched opposite end members, which may be injection molded, and secured to each end of the elongated spacer portion, for example (not shown in the drawings).

I claim:

1. A tree branch spreader for structural training and supportive orientation of growing limbs and branches, comprising an elongated spacer portion having a top surface and bottom surface and further having opposite ends which each further comprise a plurality of notches including a first primary notch at a relative interior position along the spacer portion, opening into and communicating with at least one wider secondary notch, the notches each further comprising at least one growing surface, curved inwardly in a concave manner with respect to the opposite ends of the spreader, and oppositely spaced apart sidewalls to provide protective surfaces of travel for the branches in an upward and outward direction.

2. A tree branch spreader as defined in claim 1 wherein the top surface of the spacer portion and the growing surfaces converge to an acute angle at each respective opposite end of the spreader thereby forming a biting edge to secure the spreader between two branches or between a branch and the tree trunk.

3. A tree branch spreader as defined in claim 2 wherein each opposite end further comprises three successively wider notches and terminates with oppositely spaced apart growing surfaces in coplaner alignment with the other growing surfaces of said notches.

4. A tree branch spreader for structural training and supportive orientation of growing limbs and branches comprising an elongated spacer portion, trapezoidal in shape and having a top surface and bottom surface wherein the top surface is greater in length than the bottom surface and having opposite ends which each further comprise a plurality of integrally formed intercommunicating notches, successively increasing in width to define partial openings to receive the branches or limbs of varying diameter, and in respect to the growth of the branches, to provide a means to protectively guide the branches, and a means to establish a path of travel for branches, said notches further comprising:

(a) a first primary notch at a relative interior position along the spacer portion from its respective opposite end, the primary notch further comprising: a primary resting surface, curved inwardly in a concave manner with respect to the opposite ends of the spreader and transversely positioned to the longitudinal axis of the spreader; and opposite spaced apart side walls, substantially parallel to each other and angularly displaced from the primary resting surface toward their respective opposite end, and;

(b) at least one larger secondary notch extending from and openly communicating with the primary notch and positioned at a relative exterior position along the spacer portion and openly communicating with its respective opposite end of the spreader, each of the secondary notches further comprising at least one secondary resting surface, curved inwardly in a concave manner with respect to the opposite ends of the spreader and angularly displaced outwardly from the sidewalls of the primary notch, and oppositely spaced apart sidewalls, in substantial parallel alignment and angularly depending from their respective secondary resting surface and depending toward a respective opposite end, said resting surfaces of each larger secondary notch depending from and forming a continuous edge with the smaller adjacent relatively interior positioned notch, said ends of a tree branch spreader terminating in oppositely spaced apart resting surfaces, coplaner in alignment and parallel with the other resting surfaces, further depending from the sidewalls of the adjacent smaller relatively interior located notch.

* * * * *